United States Patent [19]

Takamatsu et al.

[11] Patent Number: 4,514,152
[45] Date of Patent: Apr. 30, 1985

[54] GEROTOR POWER STEERING APPARATUS WITH DRIVEN ROTARY SLEEVE VALVE

[75] Inventors: Takashi Takamatsu, Chigasaki; Tetsuo Ohnuki, Fujisawa, both of Japan

[73] Assignee: Tokyo Keiki Company, Ltd., Tokyo, Japan

[21] Appl. No.: 516,442

[22] Filed: Jul. 22, 1983

[30] Foreign Application Priority Data

Aug. 2, 1982 [JP]  Japan ................................ 57-135012
Aug. 4, 1982 [JP]  Japan ................................ 57-136103

[51] Int. Cl.³ ........................ B62D 5/08; F15B 13/04
[52] U.S. Cl. ............................ 418/61 B; 137/625.24
[58] Field of Search ............... 418/61 B; 60/384, 386; 180/132; 137/596, 625.24; 91/375 R

[56] References Cited

U.S. PATENT DOCUMENTS

Re. 30,992  7/1982  Bertanza ........................... 418/61 B
4,016,949   4/1977  Plate et al. ........................... 60/384
4,159,723   7/1979  Baatrup et al. ................... 418/61 B
4,300,594  11/1981  Bacardit ........................... 91/375 R

FOREIGN PATENT DOCUMENTS 56-44490  4/1981  Japan ................................. 418/61 B Primary Examiner—John J. Vrablik
Attorney, Agent, or Firm—Wenderoth, Lind & Ponack

[57] ABSTRACT

A power steering apparatus comprises a housing, a gerotor mechanism having a rotor and a stator, and a rotary valve mechanism constituted by a rotary spool disposed within the central interior of the housing and connected to the rotor of the gerotor mechanism and a rotary sleeve freely rotatably attached to the outside of the rotary spool so as to allow insertion of the rotary spool thereinto. Rotation of the sleeve relative to the spool due to a steering operation switches over the flow paths for pressurized liquid to the gerotor mechanism to thereby rotate the rotor of the gerotor mechanism in the direction corresponding to the steering operation. The pressurized liquid in an amount proportional to the degree of the steering operation is supplied from the liquid chambers of the gerotor mechanism contracted by the rotation of the rotor to actuators of a steering mechanism.

4 Claims, 31 Drawing Figures

FIG.11A   FIG.11B   FIG.11C
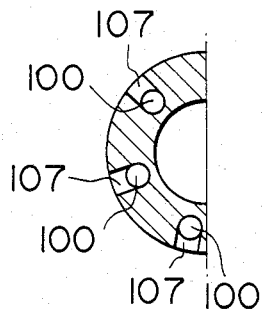 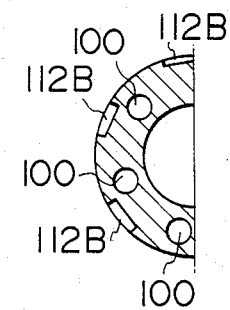 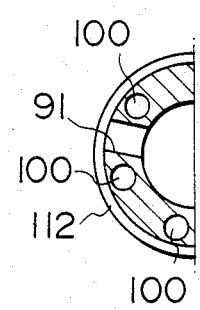
FIG.11D   FIG.11E   FIG.11F
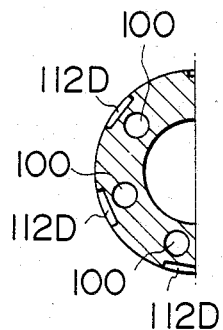 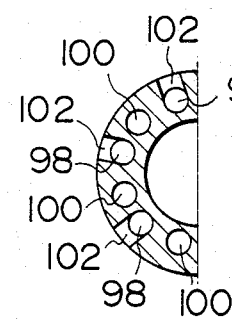 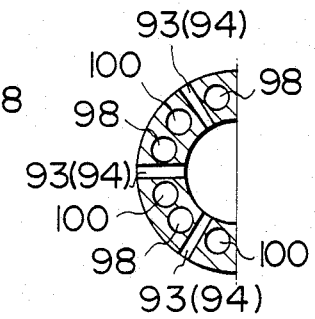
FIG.11G   FIG.11I   FIG.11J
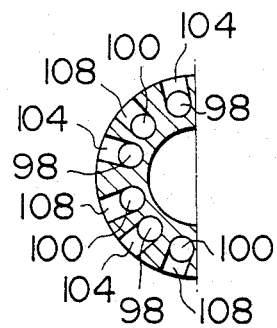 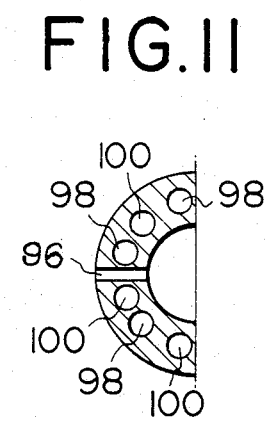 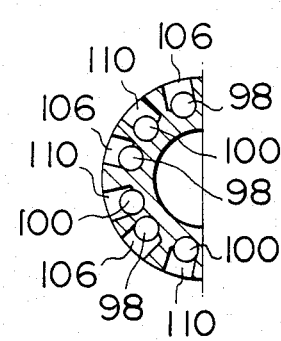

GEROTOR POWER STEERING APPARATUS WITH DRIVEN ROTARY SLEEVE VALVE

BACKGROUND OF THE INVENTION

1. Field of the Invention

The present invention relates generally to a power steering apparatus adapted to supply to an actuator of a steering mechanism pressurized liquid in an amount proportional to the degree of steering operation by utilization of a metering function of a gerotor, and particularly to a power steering apparatus in which a valve mechanism for the switchover of fluid paths which communicate with a gerotor is improved in processibility to contribute to reduction in cost.

2. Description of the Prior Art

A conventional power steering apparatus of the type utilizing a metering mechanism of a gerotor is disclosed in U.S. Pat. No. Re. 25,126, for example. The conventional power steering apparatus is characterized by connecting a steering rotary shaft to a rotary spool freely rotatably attached to the center of a housing, installing a sleeve having the rotary spool inserted therein and at the same time connecting the sleeve to a gerotor so as to be rotated by a rotor of the gerotor, applying liquid pressure to the gerotor via the sleeve by the rotation of the spool during a steering operation, thereby rotating the rotor in synchronism with the steering operation, transmitting the rotation of the rotor to the sleeve to thereby allow the sleeve to be rotated in a follow-up fashion relative to the rotation of the spool, and supplying pressurized liquid in an amount proportional to the degree of the steering operation from a portion of the gerotor contracted by the rotation of the rotor to an actuator of a steering mechanism, thereby actuating the steering mechanism with a small operating force.

With the conventional power steering apparatus, however, since there is adopted a rotary valve mechanism wherein the sleeve rotated in a follow-up fashion by the gerotor is provided around the outer periphery of the spool rotated by the steering operation so that the spool is inserted into the sleeve, a plurality of opening grooves are required to be formed in the outer circumference of the spool in the axial direction for the purpose of allowing switchover holes bored both in the spool and in the sleeve to register with each other, and the opening portions of the switchover holes are required to be widened as spot facing holes for the purpose of sufficiently securing the area of the fluid paths. The formation of the opening grooves and the opening portions of the switchover holes requires not only perforation processing but also special processing of spot facing for forming the grooves in the axial direction. Thus, a number of processing steps are required for the spool and the sleeve which constitute the rotary valve mechanism, thereby bringing about a rise in cost. What is worse, since a plurality of opening grooves are formed between the spool and the sleeve, there gives rise to a phenomenon of leakage of the liquid from gaps between the sleeve and the spool. In order to attempt to prevent this liquid leaking phenomenon from occurring, the rise in cost is further brought about.

Further, the conventional power steering apparatus is provided with a centering mechanism for maintaining the spool and the sleeve in a neutral state which intercepts the supply of pressurized liquid to the gerotor to bring the apparatus to a standstill. The centering mechanism has a construction such that a pair of leaf springs are fitted in notched portions which are formed in a direction perpendicular to the shaft and disposed at a prescribed position of a combination of the spool and the sleeve fitted to each other, and that stopper pins are provided at different positions, fixed to the outer sleeve and loosely extending through the inner spool. Therefore, the axial lengths of the spool and the sleeve are made larger by an extent corresponding to the fact that the leaf springs and the stopper pins are provided separately. Further, it is required to process the spool and the sleeve to form therein holes for fitting the leaf springs and the stopper pins in addition to a plurality of holes and opening grooves for forming the switchover fluid paths. Thus, the conventional power steering apparatus entails a disadvantage that the valve becomes large in size and complicated in construction.

SUMMARY OF THE INVENTION

One object of the present invention is to provide a power steering apparatus in which switchover fluid paths to be formed in a rotary valve mechanism constituted by a rotary spool and a rotary sleeve can be processed with ease, thereby enhancing processing accuracy and obtaining a reduction in cost and, at the same time, the leakage of liquid from the rotary valve mechanism is effectively prevented.

Another object of the present invention is to provide a power steering apparatus in which the processing of all switchover fluid paths can be effected by perforation processing with a drill, etc.

Still another object of the present invention is to provide a power steering apparatus in which a centering mechanism can be provided on one portion of a rotary valve mechanism to thereby prevent the rotary valve mechanism from becoming large in size.

The aforementioned objects, and other and further objects, features and advantages of the present invention will appear more fully from the following description with reference to the accompanying drawings.

BRIEF DESCRIPTION OF THE DRAWINGS

FIGS. 11A, 11B, 11C, 11D, 11E, 11F, 11G, 11I and 11J are cross sections taken respectively along the lines 11A—11A, 11B—11B, 11C—11C, 11D—11D, 11E—11E, 11F—11F, 11G—11G, 11I—11I and 11J—11J in FIG. 8.

DESCRIPTION OF THE PREFERRED EMBODIMENT

Figure 1:
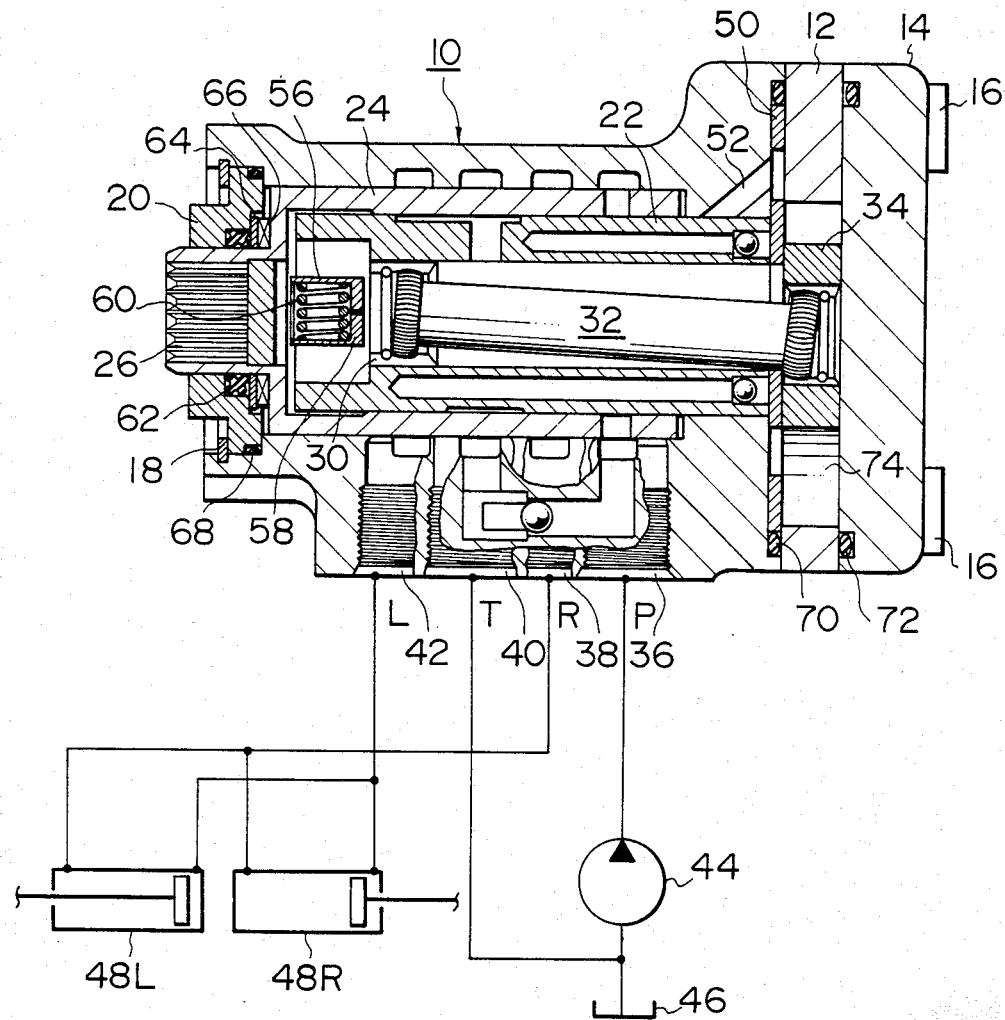
FIG. 1 is a longitudinal cross section showing one embodiment of the power steering apparatus according to the present invention.

FIG. 1 is an explanatory cross section showing one embodiment of the power steering apparatus according to the present invention, with a hydraulic source and actuators of a steering mechanism illustrated therein.

A housing 10 incorporating therein a rotary valve mechanism has an end cover 14 fastened stationarily to the right side thereof through a stator 12 of a gerotor mechanism with bolts 16 and has a front cover 20 attached to the left side thereof by snugly fitting a retainer 18 in the left side of the housing.

A cylindrical spool 2 is freely rotatably inserted into the center of the housing 10, and a sleeve 24 is freely rotatably attached to the outside of the spool 22 so that the spool is inserted into the sleeve. The sleeve 24 is provided in the left end thereof with splines 26 in which the rotary shaft of a steering wheel is to be snugly fitted.

On the other hand, the spool 22 disposed within the central portion of the housing 10 is provided in the inside diameter portion thereof with splines 30 with which the left end of a dog bone or wobble shaft 32 is to be engaged. The right end of the dog bone 32 is snugly fitted in splines formed in a rotor 34 which is disposed within the stator 12 of the gerotor mechanism.

The housing 10 is provided on the lower end thereof with a pump port 36, a right port 38 for driving the actuators of the steering mechanism to the right side, a tank port 40 and a left port 42 for driving the actuators to the left side. To the pump port 36 is connected a discharge line of a hydraulic pump 44, and the tank port 40 is connected to a line on the side of a tank 46 of the hydraulic pump 44. The right port and the left port are connected respectively to the actuators 48R and 48L of the steering mechanism.

Further, in the cross section of FIG. 1, there is interposed a plate 50 between the housing 10 and the stator 12 of the gerotor mechanism. In this embodiment, since the stator has seven internal teeth and the rotor 34 has external teeth less by one than the teeth of the stator, i.e. six external teeth, the gerotor mechanism forms seven vacant spaces between the internal and external teeth of the stator 12 and the rotor 34. Through holes 52 are formed aslant from the outer circumferential portion of the spool 22 so as to communicate with the vacant spaces. There are seven such through holes 52 which are equidistantly formed in the radial direction.

On the left side of the sleeve 24 and the spool 22 accommodated in the housing 10, there are formed rectangular notched portions 56 into which a torsion bar 58 having a construction divided in the direction perpendicular to the axial direction is inserted. A spring 60 is interposed between the divided segments of the torsion bar 58 so as to tend to center the spool 22 rotated by the gerotor mechanism in a follow-up fashion relative to the rotation of the sleeve 24 during a steering operation.

A bearing construction of the sleeve 24 relative to the front cover 20 attached to the left side of the housing 10 comprises an X-seal 62, a thrust washer 64 and a thrust bearing 66. Sealing between the housing 10 and the front cover 20 is completed with an O-ring 68. The stator 12 of the gerotor mechanism attached to the right side of the housing 10 has its opposite contact surfaces sealed with O-rings 70 and 72 respectively.

Pressurized liquid flow paths formed in the housing 10, sleeve 24 and spool 22 of the embodiment of the present invention shown in FIG. 1 will be specifically described in detail later in connection with the respective component parts.

Figure 2:
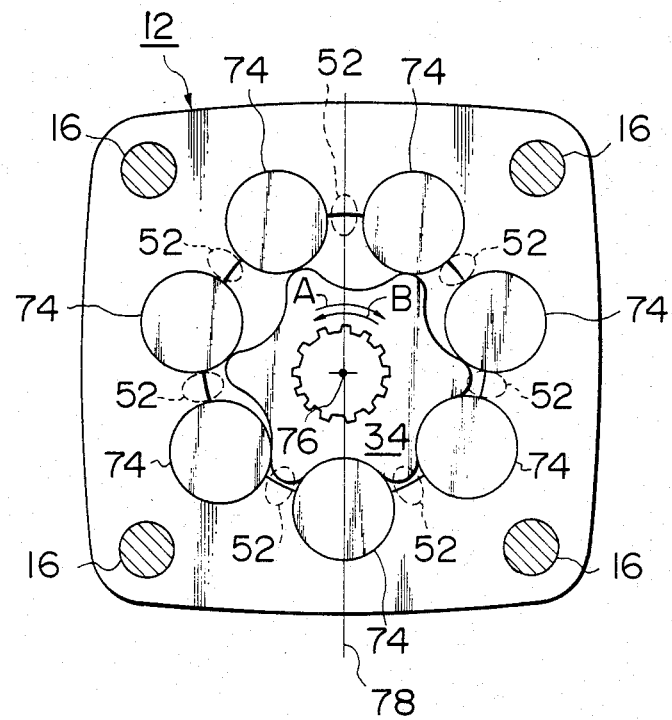
FIG. 2 is an end view showing a gerotor mechanism used in the embodiment of FIG. 1.

FIG. 2 is an end view showing the gerotor mechanism when viewed from the front cover 20 side in the embodiment of FIG. 1. On the inner circumferential wall of the liquid chamber of the stator 12, seven rollers 74 are equidistantly arranged to constitute internal teeth. The rotor 34 having its central axis 76 eccentric to the center of the stator has six external teeth which are engaged with the internal teeth of the stator so that seven vacant spaces are formed between the internal and external teeth of the stator 12 and the rotor 34.

The through holes 52 formed aslant in the side of the housing 10 as shown by the broken lines in FIG. 2 open to the aforementioned seven vacant spaces.

The gerotor mechanism as described above fulfills a metering function to supply liquid in an amount proportional to the degree of the steering operation from the hydraulic pump to the actuators of the steering mechanism in the power steering apparatus of the present invention.

To be specific, when liquid pressure is applied from the hydraulic pump to the vacant spaces on the right side relative to an eccentric line 78 which connects the center of the stator 12 and the eccentric axis 76 of the rotor 34, the rotor 34 makes an orbital motion in the clockwise direction as shown by the arrow A in FIG. 2 while rotating on its own axis in the counterclockwise direction and, consequently, the vacant spaces on the left side relative to the eccentric line 78 are contracted by the orbital motion of the rotor 34 in the direction of the arrow A. Liquid in an amount equal to the contracted volume of the vacant spaces on the left side relative to the eccentric line 78 is supplied to the actuators of the steering mechanism. Contrary to this, when liquid pressure is applied from the hydraulic pump to the vacant spaces on the left side relative to the eccentric line 78, the rotor 34 makes an orbital motion in the counterclockwise direction shown by the arrow B in FIG. 2 while rotating on its own axis in the clockwise direction and, as a result, the vacant spaces on the right side relative to the eccentric line 78 are contracted. Liquid in an amount corresponding to the contracted volume of the contracted vacant spaces is supplied from the hydraulic pump to the actuators of the steering mechanism.

Figure 3:
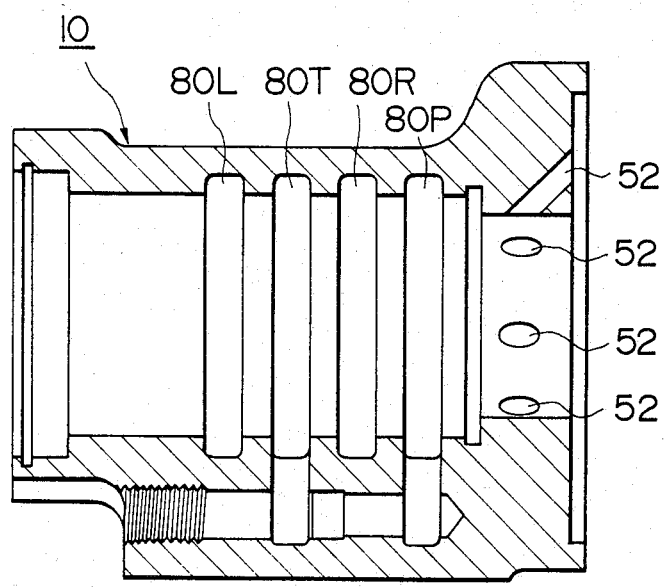
FIG. 3 is a cross section showing a housing removed from the power steering apparatus of FIG. 1.
Figure 4:
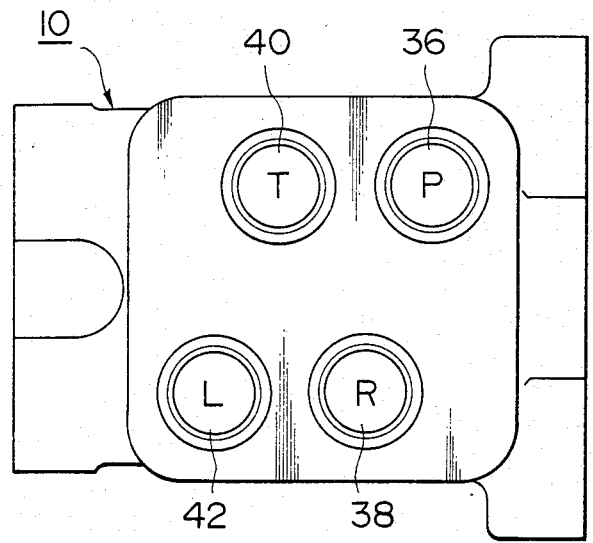
FIG. 4 is a side view showing the housing of FIG. 3 on the port side.

FIG. 3 illustrates the housing 10 removed from the embodiment of FIG. 1, and FIG. 4 is a side view showing the housing on the port side.

The housing 10 is provided in the inner circumference of the interior thereof with four annular grooves 80P, 80R, 80T and 80L which communicate respectively with the pump port 36, right port 38, tank port 40 and left port 42 and also is provided in the inside diameter portion on the right side thereof with six through holes 52 which communicate with the vacant spaces in the gerotor mechanism shown in FIG. 2. The capital letters P, R, T and L used herein indicate the initials of the pump, right, tank and left ports respectively.

Figure 5:
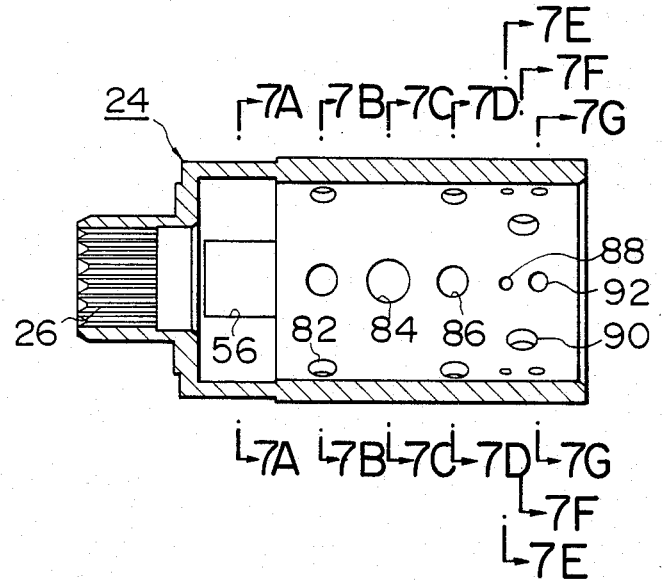
FIG. 5 is a cross section showing a sleeve removed from the power steering apparatus of FIG. 1.
Figure 6:
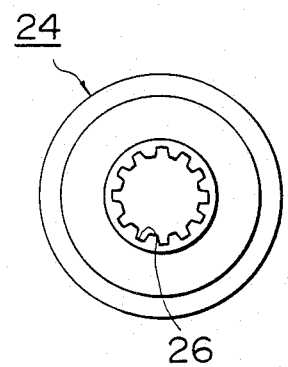
FIG. 6 is a right side view showing the sleeve of FIG. 5.
Figure 7A:
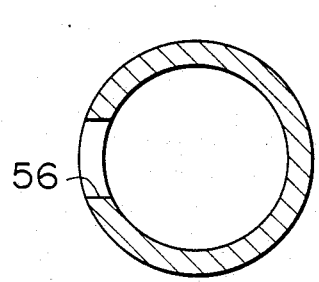
FIGS. 7A, 7B, 7C, 7E, 7F and 7G are cross sections taken respectively along the lines 7A—7A, 7B—7B, 7C—7C, 7E—7E, 7F—7F and 7G—7G in FIG. 5.
Figure 7B:
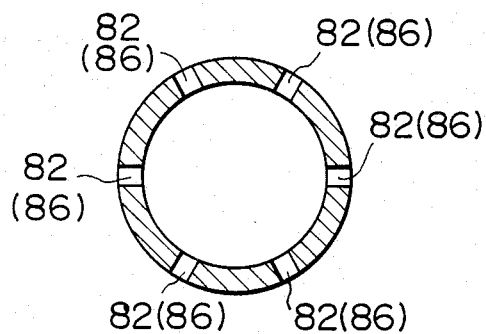
Figure 7C:
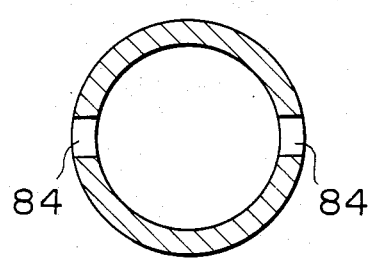
Figure 7E:
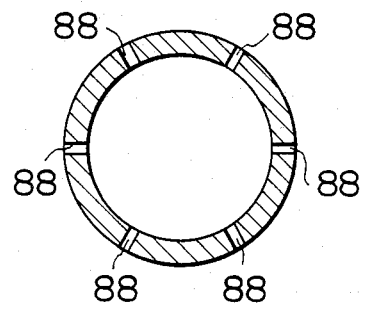
Figure 7F:
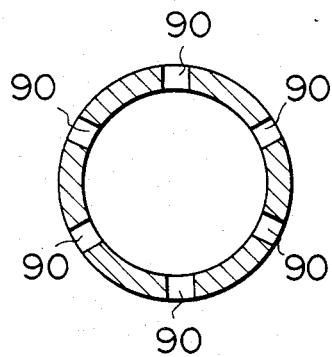
Figure 7G:
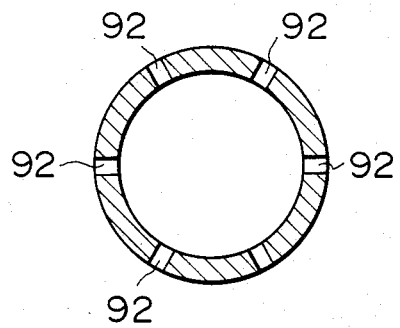

FIG. 5 shows the sleeve 24 removed from the embodiment of FIG. 1, and FIGS. 7A, 7B, 7C, 7E, 7F and 7G are cross sections respectively taken along the lines 7A—7A, 7B—7B, 7C—7C, 7E—7E, 7F—7F and 7G—7G in FIG. 5. The cross section taken along the line 7D—7D in FIG. 5 becomes identical with the cross section of FIG. 7B.

The sleeve 24 is provided in the inside of the small diameter portion on the left end thereof with splines 26 with which the steering rotary shaft is engaged and also is provided successively in the rightward direction with a notched portion 56 for fitting therein a torsion bar for centering and holes 82, 84, 86, 88, 90 and 92 which are formed by perforation processing. The number and the location of these holes are as shown in FIGS. 7A, 7B, 7C, 7E, 7F and 7G.

Figure 8:
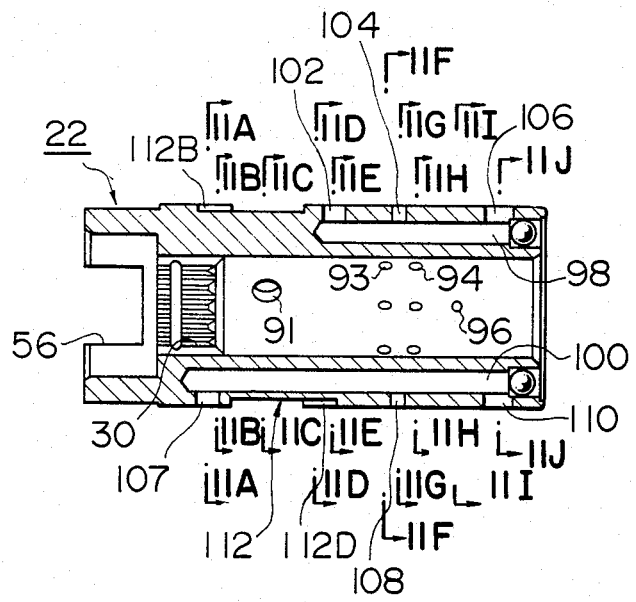
FIG. 8 is a cross section showing a spool removed from the power steering apparatus of FIG. 1, taken along line 8—8 of FIG. 10.
Figure 9:
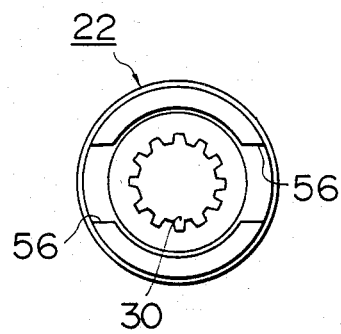
FIG. 9 is a left side view showing the spool of FIG. 8.

FIG. 8 shows the spool 22 removed from the embodiment of FIG. 1. The left and right end views of the spool are respectively shown in FIGS. 9 and 10. (FIG. 8 is a cross section taken along the line 8—8 in FIG. 10.) FIGS. 11A, 11B, 11C, 11D, 11E, 11F, 11G, 11I and 11J are cross sections taken along the lines 11A—11A, 11B—11B, 11C—11C, 11D—11D, 11E—11E, 11F—11F, 11G—11G, and 11I—11I and 11J—11J in FIG. 8 respectively, with their respective halves omitted. The cross section taken along the line 11H—11H in FIG. 8 is identical with the cross section of FIG. 11F.

The spool 22 is provided in the left side thereof with a notched portion 56 for fitting therein a torsion bar and a spring for centering and splines 30 for the engagement with the dog bone 32 connected to the rotor 34 of the gerotor mechanism, also is provided successively in the rightward direction with holes 91 (FIG. 11C), holes 93 and 94 (FIG. 11F) and holes 96 (FIG. 11I), and further is provided from the right end to the inside thereof with through holes 98 and 100 of different axial lengths which are formed by perforation processing.

Figure 10:
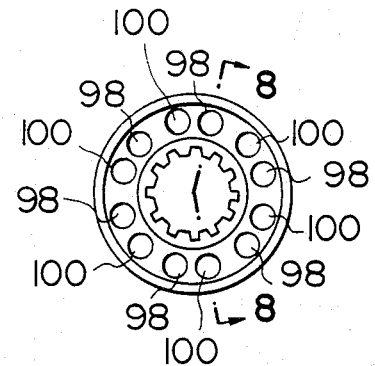
FIG. 10 is a right side view showing the spool of FIG. 8.

The positional relationship of these through holes 98 and 100 is, as shown in FIG. 10, such that six pairs each composed of a pair of through holes 98 and 100 are equidistantly arranged. The short through holes 98 open to the outer circumferential portion of the spool 22 through the medium of holes 102, 104 and 106. The long through holes 100 also open to the outer circumferential portion of the spool 22 through the medium of holes 107, 108 and 110. The number and the location of these holes are as shown in the corresponding cross sections of FIG. 11.

Spot facing recesses 112B are individually formed in six portions of the outer circumferential portion of the spool 22 shown in FIG. 8 between the holes 107 and 102, as illustrated in FIG. 11B. The six spot facing recesses 112B communicate with one another by forming an annular groove 112 in the central portions corresponding to the holes 107, i.e. in the position of FIG. 11C. Spot facing recesses 112D different in position from the side of the cross section taken along the line B—B in FIG. 8 are also individually formed in six positions on the side of the holes 102 as illustrated in FIG. 11D so as to communicate with the annular groove 112 shown in the cross section taken along the line 11C—11C in FIG. 8.

Figure 12:
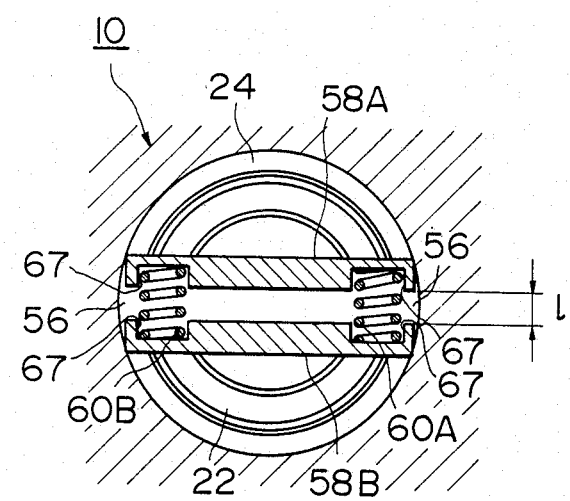
FIG. 12 is a cross section showing a centering mechanism of FIG. 1.

FIG. 12 shows a centering mechanism provided on the rotary valve mechanism in the embodiment of FIG. 1. The centering mechanism comprises opposed notched portions 56 formed in the ends of the spool 22 and the sleeve 24 on the front cover 20 side so as to open in a direction perpendicular to the shaft, torsion bar 58 divided in the circumferential direction of the shaft into a pair of torsion bar segments 58A and 58B inserted into the notched portions 56, spring accommodation holes 67 bored in the opposed surfaces of both sides of the torsion bar segments 58A and 58B, and a pair of coiled springs 60A and 60B each interposed between the opposed spring accommodation holes 67.

The centering mechanism using the torsion bar segments 58A and 58B and the coiled springs 60A and 60B serves to cause the coiled springs 60A and 60B, when the spool 22 and the sleeve 24 are not given any rotating force, to expand the torsion bar segments 58A and 58B outwardly and urge the segments to the end faces of the notched portions 56 of the spool 22 and the sleeve 24, thereby maintaining the relative position between the spool 22 and the sleeve 24 in a neutral position.

When the sleeve 24 is rotated by the steering operation, the coiled springs 60A and 60B are contracted because the torsion bar segments 58A and 58B are separated across clearance l. The sleeve 24 is loosely rotated within the clearance l relative to the spool 22. The rotation of the sleeve 24 within the clearance l switches over the fluid paths to actuate the gerotor, with the result that the spool 22 is rotated in a follow-up manner.

When the hydraulic pump for supplying pressurized liquid to the power steering apparatus is in partial operation (i.e. has partial load exerted thereon) due to mechanical trouble, etc., and when the sleeve 24 is rotated by the degree of the clearance l, the torsion bar segments 58A and 58B come into intimate contact with each other and thereby the rotation of the sleeve 24 is transmitted through the torsion bar segments 58A and 58B to the spool 22. In consequence of the rotation of the spool 22, the gerotor mechanism serves as a hydraulic pump since it has a fail-safe function.

The centering mechanism of the present invention shown in FIG. 12 has its component parts collectively mounted on the shaft and on the front side of the rotary valve mechanism comprising the spool 22 and the sleeve 24. The collective mounting of the component parts of the centering mechanism is made possible by attaching the sleeve 24 to be rotated by the steering operation to the spool 22 to be rotated by the gerotor mechanism so that the latter is inserted into the former and enabling the engagement of the dog bone 32 with the splines 30 from the gerotor mechanism side and the engagement of the steering operation shaft (the input shaft) with the splines 26 to be effected individually.

Further, since the play of the sleeve 24 relative to the spool 22 is determined merely by the clearance l between the torsion bar segments 58A and 58B and since the clearance l can easily be adjusted by varying the thickness of the torsion bar segments 58A and 58B, the centering of the rotary valve mechanism can be carried out with high accuracy.

The construction of the embodiment of the power steering apparatus according to the present invention which has been so far described, and the function thereof will now be described in detail with reference to the drawings.

The function fulfilled in a neutral state without effecting the steering operation will first be described with reference to FIG. 13.

Figure 13:
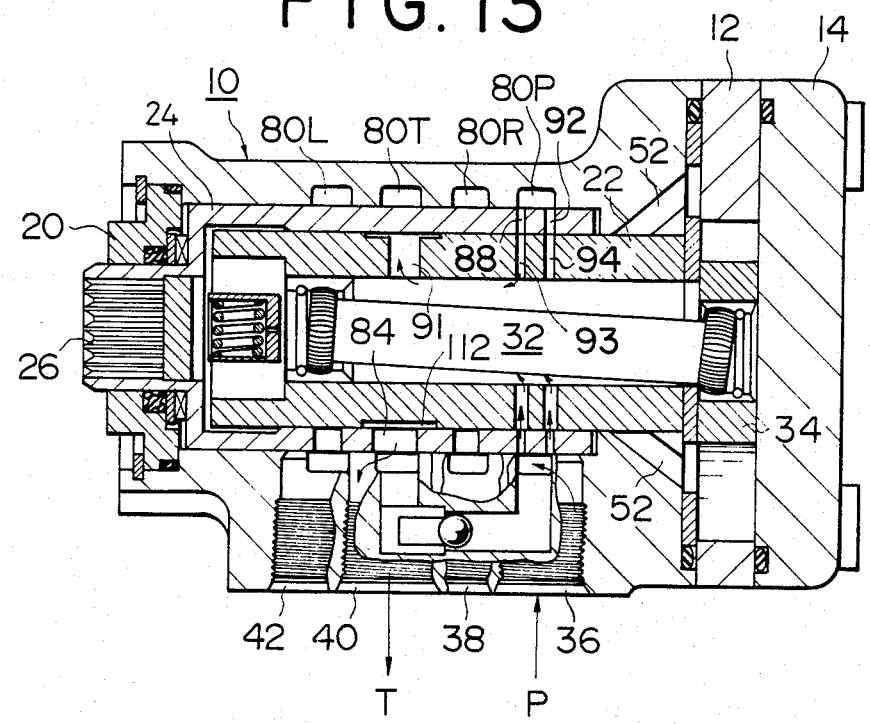
FIG. 13 is a cross section showing fluid paths when the sleeve and the spool are kept in a neutral state.

FIG. 13 shows flow paths for pressurized liquid when no operational force is exerted on the rotary shaft of a steering wheel which is snugly fitted in the splines 26 of the sleeve 24. In this neutral state, the holes 93 and 94 bored in the spool 22 on the right side thereof are allowed to register with the holes 88 and 92 bored in the sleeve 24 on the right side thereof respectively, the hole 91 in the spool 22 is opposed to the hole 84 in the sleeve 24 disposed on the tank port side of the housing 10 through the annular groove 112 formed in the outer circumferential portion, and the pump port 36 communicates through the flow path of the valve with the tank port 40. Therefore, liquid pressure of the tank port 40 is applied to all the through holes 52 communicating with the vacant spaces in the gerotor mechanism.

For this reason, the pressurized liquid from the hydraulic pump in the neutral state is supplied first to the pump port 36, then flows into the annular groove 80P of the housing 10, subsequently passes successively through the holes 88 and 92 in the sleeve 24 and the holes 93 and 94 in the spool 22 into the interior of the spool 22 which accommodates therein the dog bone 32. Since the interior of the spool 22 communicates with the hole 91 and the hole 84 in the sleeve 24 through the annular groove 112 formed in the outer circumference of spool 22, and since the hole 84 in the sleeve 24 communicates with the tank port 40 through the annular groove 80T, the liquid from the pump port 36 is returned back to the tank side through the tank port 40.

The function established at the time the steering wheel is rotated in the counterclockwise direction will be described with reference to FIG. 14.

Figure 14:
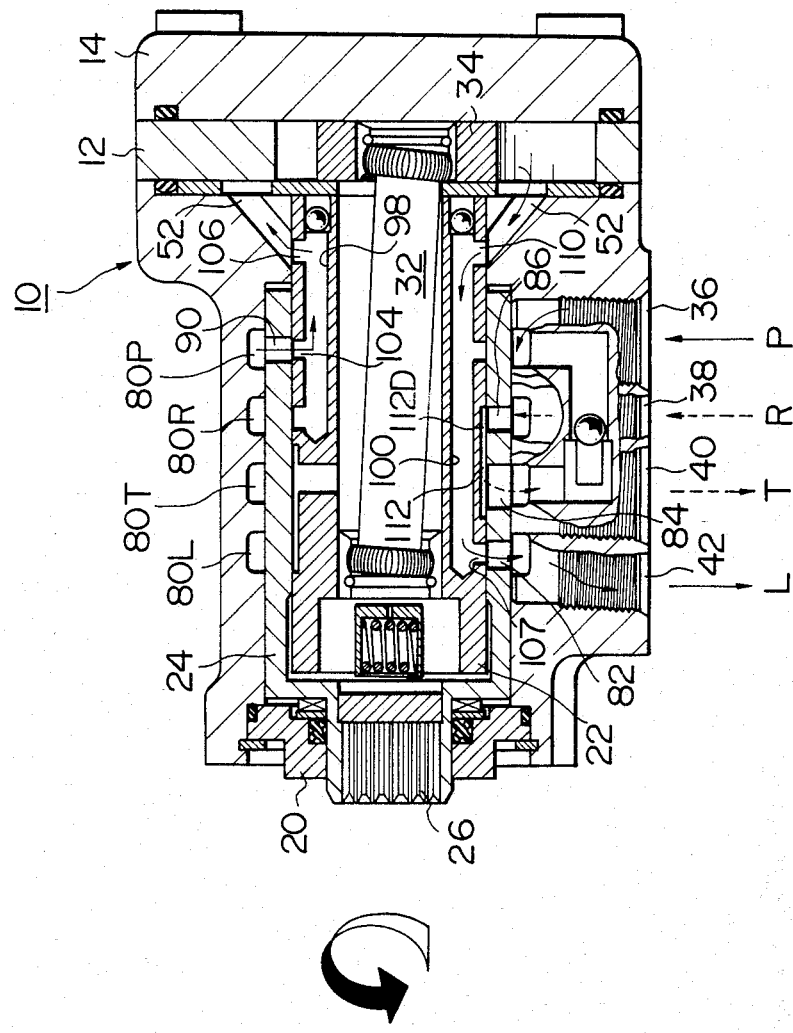
FIG. 14 is a cross section showing the fluid paths when a steering wheel is rotated in the counterclockwise direction.

When the steering wheel is rotated in the counterclockwise direction, the sleeve 24 is rotated in the counterclockwise direction and forms in conjunction with the spool 22 the fluid paths as illustrated in FIG. 14.

Figure 15:
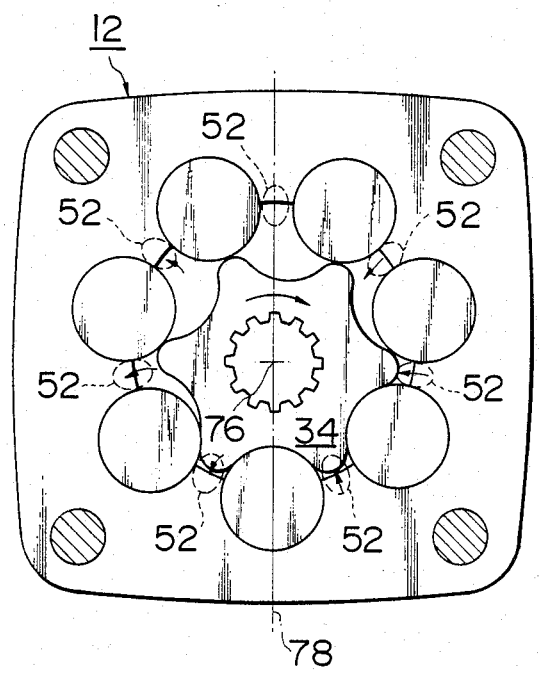
FIG. 15 is an end view showing the movement of the gerotor when the steering wheel is rotated in the counterclockwise direction.

To be specific, when the sleeve 24 is rotated in the counterclockwise direction, the hole 90 in the sleeve 24 coincides with the central hole 104 of the through hole 98 formed in the axial direction in the interior of the spool 22, and the hole 82 in the sleeve 24 coincides with the leftmost hole 107 of the longer through hole 100 in the spool 22. Further, the holes 106 of the short through holes 98 formed in the interior of the spool 22 communicate with the vacant spaces disposed on the right side relative to the eccentric line 78 in the end view of FIG. 15 showing the gerotor when viewed from the front cover 20 side through the through holes 52 formed aslant in the housing 10. The holes 110 of the long through holes 100 formed in the axial direction in the spool 22 similarly come to communicate with the vacant spaces disposed on the left side relative to the eccentric line 78 shown in FIG. 15 through the through holes 52 formed aslant in the housing 10.

The pressurized liquid flows successively through the pump port 36, annular groove 80P disposed on the right side of the housing 10, hole 90 in the sleeve 24 and hole 104 in the spool 22, then reaches the through hole 52 in the housing 10 through the through hole 98 and the hole 106, and is supplied to the vacant spaces between the stator 12 and the rotor 34 of the gerotor mechanism on the right side relative to the eccentric line 78.

The supply of the pressurized liquid into the gerotor mechanism allows the rotor 34 to make an orbital motion in the clockwise direction as indicated by the arrow in FIG. 15 while rotating on its own axis in the counterclockwise direction, with the result that the vacant spaces on the left side relative to the eccentric line 78 are contracted. The contracted vacant spaces disposed on the left side relative to the eccentric line 78 open to the through hole 52 of the housing 10 and communicate with the long through holes 100 in the spool 22 as shown on the lower side in FIG. 14. Therefore, the pressurized liquid fed out of the gerotor mechanism is supplied, through the leftmost hole 107 of the through hole 100 in the spool 22, hole 82 in the sleeve 24 and annular groove 80L of the housing 10 successively and then via the left port 42, into the actuators of the steering mechanism.

Thus, the liquid in the amount metered by the gerotor mechanism is supplied to the respective right sides of the actuators 48R and 48L of the steering mechanism in FIG. 1 and, as a result, the actuators 48R and 48L are driven in the counterclockwise direction in proportion to the counterclockwise rotation of the steering wheel.

When the actuators 48R and 48L are driven in the counterclockwise direction, as described above, the liquid from the actuators 48R and 48L is supplied to the right port 38, then passes through the annular groove 80R in the housing, recess 86 in the sleeve and spot facing hole 112D in the spool into the annular groove 80T, and is returned back to the tank via the tank port 40.

Meanwhile, when the fluid paths are formed as illustrated in FIG. 14 and when the rotor 34 of the gerotor mechanism rotates on its own axis in the counterclockwise direction as shown in FIG. 15, the counterclockwise rotation is transmitted to the spool 22 through the dog bone 34. The spool 22 is rotated in a follow-up manner relative to the counterclockwise rotation of the sleeve 24 and, when the steering wheel stops its counterclockwise rotation, the sleeve and the spool are brought to a neutral state as shown in FIG. 13, with the result that the supply of the pressurized liquid in an amount proportional to the degree of the steering operation to the actuators is stopped.

The function fulfilled when the steering wheel is rotated in the clockwise direction will be described with reference to FIG. 16.

Figure 16:
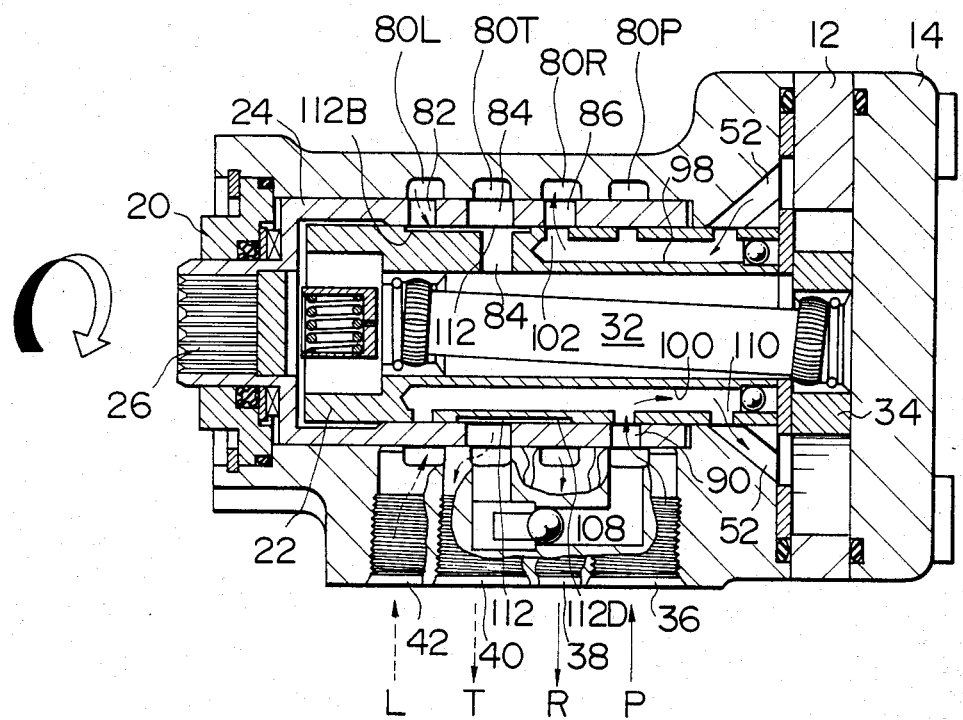
FIG. 16 is a cross section showing the fluid paths when the steering wheel is rotated in the clockwise direction.

When the sleeve 24 is rotated in the clockwise direction by the clockwise rotation of the steering wheel, there are formed fluid paths as shown in FIG. 16.

That is to say, when the sleeve 24 in its neutral position is rotated in the clockwise direction, the annular groove 80P of the housing 10 communicating with the pump port 36 opens to the hole 90 of the sleeve and communicates with the hole 108 of the long through hole 100 in the spool 22, the short through hole 98 in the spool 22 is opposed to the hole 86 in the sleeve 24 with the hole 102 interposed therebetween, and the annular grooves 80L and 80T of the housing 10 communicate with each other through the spot facing recess 112B and annular groove 112 formed in the outer circumference of the spool 22 and the holes 82 and 84 in the sleeve 24.

Figure 17:
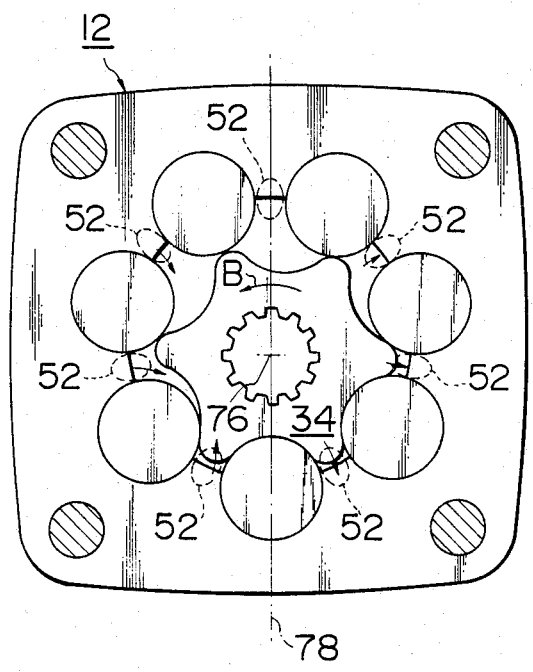
FIG. 17 is an end view showing the movement of the gerotor when the steering wheel is rotated in the clockwise direction.

When the steering wheel is rotated in the clockwise direction, therefore, the pressurized liquid supplied from the hydraulic pump to the pump 36 flows through the annular groove 80P of the housing 10, hole 90 of the sleeve 24 and hole 108 of the spool 22 into the long through hole 100 and is supplied from the hole 110 of the through hole 100 through the through hole 52 formed aslant in the housing 10 into the vacant spaces disposed on the left side relative to the eccentric line 78 in the gerotor mechanism when viewed from the front cover 20 side as illustrated in the end view of FIG. 17.

The supply of the pressurized liquid into the vacant spaces disposed on the left side relative to the eccentric line 78 allows the rotor 34 to make an orbital motion in the counterclockwise direction as indicated by the arrow in FIG. 17 while rotating on its own axis in the clockwise direction, with the result that the vacant spaces on the right side relative to the eccentric line 78 are contracted by the orbital motion of the rotor 34. Consequently, the pressurized liquid in an amount proportional to the contracted volume of the vacant spaces is supplied through the through hole 52 on the upper portion in FIG. 16 to the short through hole 98 of the spool 22.

Since the through hole 98 is opposed to the hole 86 of the sleeve across the hole 102, the pressurized liquid fed out of the gerotor mechanism is supplied through the hole 86 of the sleeve 24 to the annular groove 80R of the housing 10. The pressurized liquid thus supplied to the annular groove 80R is then supplied through the right port 38 to the respective left sides of the actuators 48R and 48L of the steering mechanism shown in FIG. 1.

Consequently, the actuators 48R and 48L are driven in the clockwise direction in proportion to the degree of the steering wheel operation. Return liquid in consequence of the drive of the actuators 48R and 48L in the clockwise direction is supplied to the left port 42 in FIG. 16, returned to the hole 84 of the sleeve 24 through the annular groove 80L of the housing 10, hole 82 of the sleeve 24 and spot facing recess 112 B and annular groove 112 formed in the outer circumference of the spool 22, passed from the hole 84 through the annular groove 80T of the housing 10 to the tank port 40, and discharged to the tank side.

In the meantime, the fluid paths shown in FIG. 16 are kept intact during the time when the sleeve 24 is rotated in the clockwise direction by the steering wheel, and the spool 22 is rotated in the clockwise direction in a follow-up manner relative to the clockwise rotation of the sleeve 24 by the dog bone 32 to which the rotor 34 of the gerotor mechanism shown in FIG. 17 transmits its clockwise rotation on its own axis. When the steering wheel stops its clockwise rotation, the spool 22 rotated in a follow-up manner by the gerotor mechanism is brought to its neutral position to stop its rotation, with the result that the supply of liquid pressure to the actuators of the steering mechanism is stopped.

The fail-safe function of the gerotor mechanism will be described with reference to FIG. 18 which shows the state in which the pressurized liquid is prevented from being supplied because of partial operation of the liquid pressure source due to mechanical trouble, etc. of the hydraulic pump.

When the liquid pressure source is in partial operation, the gerotor mechanism of the power steering apparatus according to the present invention comes to serve also as a pump for applying liquid pressure to the steering mechanism and causes the operational force of the steering wheel to be doubled, thereby ensuring the steering operation even at such partial operation of the liquid pressure source.

In order to realize that the gerotor mechanism can function as a pump in partial operation of the liquid pressure source, in the embodiment of FIG. 1 according to the present invention, there is utilized a check valve 120 disposed in the fluid path which connects within the housing 10 the annular groove 80P of the pump port 36 and the annular groove 80T of the tank port 40.

Figure 18:
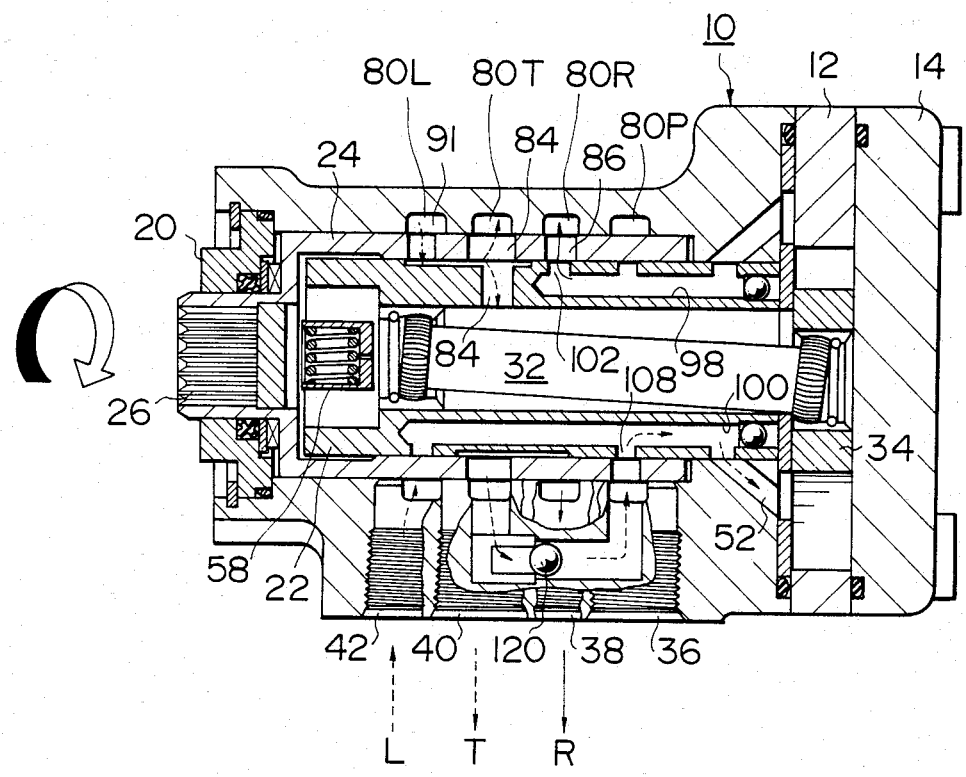
FIG. 18 is a cross section showing the fluid paths with the steering wheel rotated in the clockwise direction when a liquid pressure source is in partial operation.

When the steering wheel is rotated in the clockwise direction in FIG. 18 showing that the liquid pressure source is in partial operation, for example, the fluid paths formed by the clockwise rotation of the sleeve 24 due to the clockwise rotation of the steering wheel are the same as those shown in FIG. 16.

However, since the pressurized liquid is not supplied to the pump port 36, the mechanical rotation of the sleeve 24 causes the spool 22 to be rotated by means of intimate contact between the segments of the torsion bar 58 having a centering function. The rotation of the spool 22 is transmitted to the dog bone 32 and the rotation of the dog bone allows the rotor 34 of the gerotor mechanism to be rotated.

The liquid from the left port 42 or tank port 40 is sucked through the long through hole 100 of the spool 22 and slanted through hole 52 of the housing 10 into the vacant spaces to be expanded between the stator 12 and the rotor 34 of the gerotor mechanism by the rotation of the rotor 34 of the gerotor mechanism. Of the liquid sucked into the gerotor mechanism, part thereof present in the vacant spaces contracted by the rotation of the rotor 34 is pressurized, then the pressurized liquid is discharged through the short through hole 98 of the spool 22, hole 86 of the sleeve and annular groove 80R of the housing to the right port 38, and the liquid pressurized by the rotation of the rotor 34 of the gerotor mechanism given by the clockwise rotation of the steering wheel is supplied to the actuators of the steering mechanism, thereby enabling the steering mechanism to be driven by the action of the doubled liquid pressure even in partial operation of the liquid pressure source.

According to the aforementioned embodiment of the present invention, as described above, it is possible to materialize the formation of all the fluid paths in the sleeve 24 and the spool 22 which constitute the rotary valve mechanism by means of mere perforation processing using a drill and to sufficiently secure the areas of the fluid paths without effecting spot facing processing for widening the opening portions of the perforation-processed holes. Therefore, the present invention makes it possible to reduce the processing cost to a great extent as compared with the prior art. Further, since the opening areas of the holes in the present invention are much smaller than those of the opening grooves in the prior art, the present invention also makes it possible to considerably reduce liquid leakage in the rotary valve mechanism.

What is claimed is:

1. A gerotor steering apparatus comprising:
 a housing;
 a gerotor mechanism provided with a stator fixed to said housing and having teeth, a rotor having teeth of a number less by one than the number of said teeth of said stator, and a plurality of liquid chambers formed between said stator and said rotor so as to be expandable and contractible in accordance with rotation of said rotor; and rotary valve mechanism means having fluid paths to be switched over by a steering operation for rotating said rotor of said gerotor mechanism in a direction corresponding to the steering operation and for supplying pressurized liquid in an amount proportional to the degree of the steering operation from said liquid chambers contracted by the rotation of said rotor to actuators of a steering mechanism, said rotary valve mechanism comprising:

a sleeve rotatably positioned within said housing and including means for direct connection at all times to a rotary shaft to be rotated within said housing by a steering operation;

a spool positioned within said sleeve for rotation relative thereto;

switchover fluid paths for supplying pressurized fluid from a source to said gerotor mechanism to rotate said rotor in response to rotation of said sleeve, said fluid paths comprising perforations formed in said sleeve and in said spool and through holes formed in said housing at positions closely adjacent said gerotor mechanism, said through holes opening into said liquid chambers; and means connecting said rotor to said spool for transmitting rotation of said rotor to said spool in a follow-up manner.

2. An apparatus as claimed in claim 1, wherein said through holes have straight axes inclined to the axes of said sleeve and spool.

3. An apparatus as claimed in claim 1, wherein said connecting means comprises a wobble shaft having a first end fixed rotatively to said rotor and a second end fixed rotatively to said spool.

4. An apparatus as claimed in claim 1, further comprising centering means disposed between said spool and said sleeve for maintaining said switchover fluid paths in a neutral position capable of intercepting the supply of liquid to said gerotor mechanism, said centering means comprising rectangular notches formed in respective adjacent ends of said spool and said sleeve, said notches extending in directions perpendicular to said axes of said spool and said sleeve, a pair of torsion bar segments fitted in said rectangular notches, and coiled springs interposed between said pair of torsion bar segments, said torsion bar segments and springs comprising the only direct physical connection between said spool and said sleeve.

* * * * *